United States Patent
Tang et al.

(10) Patent No.: US 10,729,117 B2
(45) Date of Patent: Aug. 4, 2020

(54) PEST MONITORING METHOD BASED ON MACHINE VISION

(71) Applicant: ZHONGKAI UNIVERSITY OF AGRICULTURE AND ENGINEER, Guangzhou, Guangdong (CN)

(72) Inventors: Yu Tang, Guangdong (CN); Shaoming Luo, Guangdong (CN); Zhenyu Zhong, Guangdong (CN); Huan Lei, Guangdong (CN); Chaojun Hou, Guangdong (CN); Jiajun Zhuang, Guangdong (CN); Weifeng Huang, Guangdong (CN); Zaili Chen, Guangdong (CN); Jintian Lin, Guangdong (CN); Lixue Zhu, Guangdong (CN)

(73) Assignee: ZHONGKAI UNIVERSITY OF AGRICULTURE AND ENGINEER, Haizhu District, Guangzhou, Guangdong (CN)

( * ) Notice: Subject to any disclaimer, the term of this patent is extended or adjusted under 35 U.S.C. 154(b) by 0 days.

(21) Appl. No.: 16/637,480
(22) PCT Filed: Dec. 25, 2017
(86) PCT No.: PCT/CN2017/118423
§ 371 (c)(1),
(2) Date: Feb. 7, 2020
(87) PCT Pub. No.: WO2019/126971
PCT Pub. Date: Jul. 4, 2019

(65) Prior Publication Data
US 2020/0178511 A1 Jun. 11, 2020

(51) Int. Cl.
*A01M 23/00* (2006.01)
*A01M 1/02* (2006.01)
(Continued)

(52) U.S. Cl.
CPC ............ *A01M 1/026* (2013.01); *A01M 23/00* (2013.01); *G06K 9/00771* (2013.01); *G06K 9/40* (2013.01);
(Continued)

(58) Field of Classification Search
CPC ........ A01M 1/026; A01M 23/00; G06K 9/40; G06K 9/6256; G06K 9/00771; G06K 9/6265; G06K 9/6202
See application file for complete search history.

(56) References Cited

U.S. PATENT DOCUMENTS

| 2005/0025357 A1* | 2/2005 | Landwehr | A01M 1/026 382/170 |
| 2006/0215885 A1* | 9/2006 | Kates | A01M 1/026 382/120 |

(Continued)

FOREIGN PATENT DOCUMENTS

| CN | 101976350 A | 2/2011 |
| CN | 103246872 A | 8/2013 |

(Continued)

OTHER PUBLICATIONS

Huddar, Sushma R., et al. "Novel algorithm for segmentation and automatic identification of pests on plants using image processing." In 2012 Third International Conference on Computing, Communication and Networking Technologies (ICCCNT'12), pp. 1-5. IEEE, 2012. (Year: 2012).*

*Primary Examiner* — Carol Wang
(74) *Attorney, Agent, or Firm* — Tutunjian & Bitetto, P.C.

(57) ABSTRACT

The present invention relates to a pest monitoring method based on machine vision. The method includes the following steps: arranging a pest trap at a place where pests gather, and setting an image acquisition device in front of the pest trap to acquire an image; identifying a pest in the acquired image, and obtaining a number of pests; extracting multiple suspicious pest images from a region of each identified pest in the image, and determining identification accuracy of each suspicious pest image, if the number of pests is greater than or equal to a preset threshold for the number of pests; and calculating a predicted level of pest damage based on the (Continued)

number of pests and the identification accuracy of each suspicious pest image. The present invention acquires a pest image automatically through the image acquisition device in front of the pest trap.

18 Claims, 2 Drawing Sheets

(51) Int. Cl.
    *G06K 9/00*     (2006.01)
    *G06K 9/62*     (2006.01)
    *G06K 9/40*     (2006.01)
(52) U.S. Cl.
    CPC ......... *G06K 9/6202* (2013.01); *G06K 9/6256* (2013.01); *G06K 9/6265* (2013.01)

(56) References Cited

U.S. PATENT DOCUMENTS

| | | | |
|---|---|---|---|
| 2013/0136312 A1 | 5/2013 | Tseng et al. | |
| 2015/0223442 A1* | 8/2015 | Yamauchi | A01M 1/103 43/121 |
| 2017/0112116 A1* | 4/2017 | Ji | H04L 67/12 |
| 2017/0273290 A1* | 9/2017 | Jay | G06K 9/00771 |
| 2018/0018414 A1* | 1/2018 | Biswas | G06F 30/20 |
| 2018/0068165 A1* | 3/2018 | Cantrell | A01M 31/002 |
| 2019/0034736 A1* | 1/2019 | Bisberg | A01G 22/00 |
| 2019/0110458 A1* | 4/2019 | Liu | G06K 9/209 |

FOREIGN PATENT DOCUMENTS

| | | |
|---|---|---|
| CN | 105850930 A | 8/2016 |
| CN | 107292891 A | 10/2017 |

\* cited by examiner

PEST MONITORING METHOD BASED ON MACHINE VISION

TECHNICAL FIELD

The present invention relates to the field of pest monitoring, and in particular, to a pest monitoring method based on machine vision (MV).

BACKGROUND

In recent years, pests cause severe damage and financial loss in some areas of China. In particular, for large areas of citruses planted in South China, citrus greening disease transmitted by psyllids has seriously affected the normal operation of citrus orchards and greatly affected the output and quality of citrus fruits. Pest control is considered as the key to controlling pest damage. Various regions have taken related control measures to prevent the citrus greening disease. In this process, the occurrence rule of the damage caused by citrus psyllids is mainly visually inspected by a person, and the degree of damage is predicted artificially. This is laborious, and the accuracy of monitored data is affected by the activity and migration of adult pests. Other traditional pest monitoring methods, such as the use of traps for monitoring, are unideal in terms of accuracy and timeliness. In addition, these methods cannot provide effective guidance for orchard pest control, and high control costs and poor results.

SUMMARY

In order to overcome the shortcomings of the prior art, the present invention provides a pest monitoring method based on machine vision (MV). The method can monitor the pest in real time and predict the degree of damage to be caused by the pest.

Aiming at the above technical problems, this patent adopts the following solution: a pest monitoring method based on MV, including the following steps:

arranging a pest trap at a place where pests gather, and setting an image acquisition device in front of the pest trap to acquire an image;

identifying a pest in the acquired image, and obtaining a number of pests;

extracting multiple suspicious pest images from a region of each identified pest in the image, and determining identification accuracy of each suspicious pest image, if the number of pests is greater than or equal to a preset threshold for the number of pests; and calculating a predicted level of pest damage based on the number of pests and the identification accuracy of each suspicious pest image.

The present invention acquires a pest image automatically through the image acquisition device in front of the pest trap. The present invention avoids the disadvantage of laborious visual inspection by a person, and realizes real-time pest monitoring. The present invention combines the number of pests and the identification accuracy of each suspicious pest image to calculate the predicted level of pest damage. Compared with the prior art that calculates the predicted level of pest damage based on the number of pests alone, the present invention has higher accuracy and obtains a more significant predicted level of pest damage. Therefore, the present invention can better guide pest control.

Further, a statistical analysis model is established in advance. The statistical analysis model is used to calculate the predicted level of pest damage based on the number of pests and the identification accuracy of each suspicious pest image.

The statistical analysis model is obtained based on training. The model can fit a relation between the predicted level of pest damage and the number of pests as well as the identification accuracy of each suspicious pest image. The final predicted level of pest damage is more targeted and more significant for guiding pest control.

Further, the predicted level H(n) of pest damage is calculated based on the statistical analysis model according to the following formula:

$$H(n) = \begin{cases} \dfrac{\sum_{i=1}^{n} p_i}{n}, & n \geq alllow_{max} \\ 0, & n < allow_{max} \end{cases}$$

where, n is the number of pests; $allow_{max}$ is the threshold for the number of pests; $p_i$ is the identification accuracy of an i-th suspicious pest image.

When the number of pests does not reach the threshold for the number of pests, the predicted level H(n) of pest damage is zero, that is, no pest damage occurs. When the number of pests is greater than or equal to the threshold for the number of pests, the identification accuracy of all suspicious pest images are accumulated. The suspicious pest images and respective possibility are taken into account, which is conducive to obtaining a more scientific predicted level H(n) of pest damage and improving the guiding significance of pest control.

Further, the pest trap includes a box and a trap lamp arranged in the box. The box is a polyhedron, and the box is open on at least one side. The image acquisition device is arranged to face a side of the box with an opening to acquire an image.

The box is used to gather light of the trap lamp, so that the image acquired by the image acquisition device is clear. The use of the box is convenient to identify a pest in the image later and improve the identification accuracy. In this way, the present invention further improves the practicability of the method, and improves the prediction accuracy, thereby facilitating people to control the pest in time.

Further, an opening of the box facing the image acquisition device is covered with a light-transmitting film. The light-transmitting film makes the light received by the image acquisition device more uniform and softer. The light-transmitting film improves the imaging quality, facilitates the identification of a pest in the image later, and improves the identification accuracy. Therefore, the present invention further improves the practicability of the method, and improves the prediction accuracy, thereby facilitating people to control the pest in time.

Further, the step of identifying a pest in the acquired image is specifically: identifying a region in the acquired image that blocks the light of the trap lamp; and determining whether a geometric feature of each region matches a shape of the pest, and if yes, identifying the corresponding region as a pest. Because of the setting of the trap lamp, it is only necessary to determine whether a geometric feature of the region blocking the light of the trap lamp in the image matches a pest. This avoids a complicated image identification process, improving the identification efficiency.

Therefore, this method ensures a real-time performance so that people can take a control measure more quickly against the pest.

Further, each region matches the shape of the pest is determined at least according to an area and a perimeter of the region. The area, the perimeter and a ratio of regions are important features. Their combination greatly reduces the rate of misjudgment, and improves the identification efficiency and the efficiency of obtaining the predicted level of pest damage. Therefore, the method is timelier for pest control.

Further, the area and the perimeter are calculated according to a pixel in the region. The area is obtained by accumulating all pixels in the region, and the perimeter is obtained by accumulating pixels at a boundary of the region. The region is generally an irregular polygon, and the simple accumulation by pixels can avoid a complex formula calculation of the area and perimeter of the irregular polygon.

Further, a pest discriminative model is established in advance. The pest discriminative model is used to determine the identification accuracy of each suspicious pest image. The pest discriminative model is obtained based on training. The model can fit a relation between the identification accuracy of each suspicious pest image and each suspicious pest image. The final identification accuracy of the suspicious pest image is more targeted, and the final predicted level of pest damage is more significant for guiding pest control.

Further, the step of establishing a pest discriminative model is specifically: making a positive sample set and a negative sample set of the pest image, positive samples being pest images in various situations, and negative samples being images including no pest; and training a neural network by the positive sample set and the negative sample set to generate a pest discriminative model.

Further, the acquired image needs to be preprocessed by denoising before identifying a pest in the acquired image and obtaining a number of pests.

Compared with the prior art, this patent has the following beneficial effects.

(1) By shooting in front of the pest trap, the image acquisition device can obtain a more accurate image and improve the accuracy of the predicted level of pest damage.

(2) The image acquired by the image acquisition device is preprocessed by denoising, and a noise is removed. This facilitates more accurate identification of the pest in the image, and improves the accuracy of the predicted level of pest damage.

(3) Because of the setting of the trap lamp, it is only necessary to determine whether a geometric feature of the region blocking the light of the trap lamp in the image matches a pest. This avoids the identification of other regions and avoids a complicated image identification step, improving the identification efficiency. Therefore, this method ensures a real-time performance so that people can take a control measure more quickly against the pest. The light-transmitting film makes the light of the trap lamp received by the image acquisition device softer, making the quality of the image shot better to obtain a more referential pest image.

(4) Each region matches the shape of the pest is determined at least according to the area and the perimeter of the region. The area, the perimeter and a ratio of regions are important features. Their combination greatly reduces the rate of misjudgment and improves the identification efficiency.

(5) The identification accuracy of each suspicious pest image is determined through the pest discriminative model. Through the training of the neural network, the pest discriminative model has higher intelligence and high accuracy, and avoids the disadvantage of subjectivity of artificial determination. In addition, the pest discriminative model can also improve the accuracy of the predicted level of pest damage.

(6) Compared with the prior art that calculates the predicted level of pest damage based on the number of pests alone, the present invention establishes a statistical analysis model in advance. The statistical analysis model combines the number of pests and the identification accuracy of each suspicious pest image to calculate the predicted level of pest damage. The combination of the statistical analysis model, the number of pests and the identification accuracy of each suspicious pest image greatly reduces a determination error, improves the effectiveness of the predicted level of pest damage, and provides more guidance for pest control.

(7) The area is obtained by accumulating all pixels in the region, and the perimeter is obtained by accumulating pixels at the boundary of the region. This avoids a complex formula calculation of the area and perimeter of each irregular polygon region. In this way, the method improves the calculation efficiency, facilitating quickly obtaining the predicted level of pest damage, and facilitating people to quickly respond to the occurrence of pest damage.

DETAILED DESCRIPTION

The present patent is further described below with reference to the accompanying drawings. The accompanying drawings are only for illustrative description and should not be construed as a limitation to the present patent. In order to better describe the present patent, some components may be omitted, enlarged or reduced in the accompanying drawings. Those skilled in the art should understand that some well-known structures and descriptions thereof may be omitted in the accompanying drawings.

Figure 1:
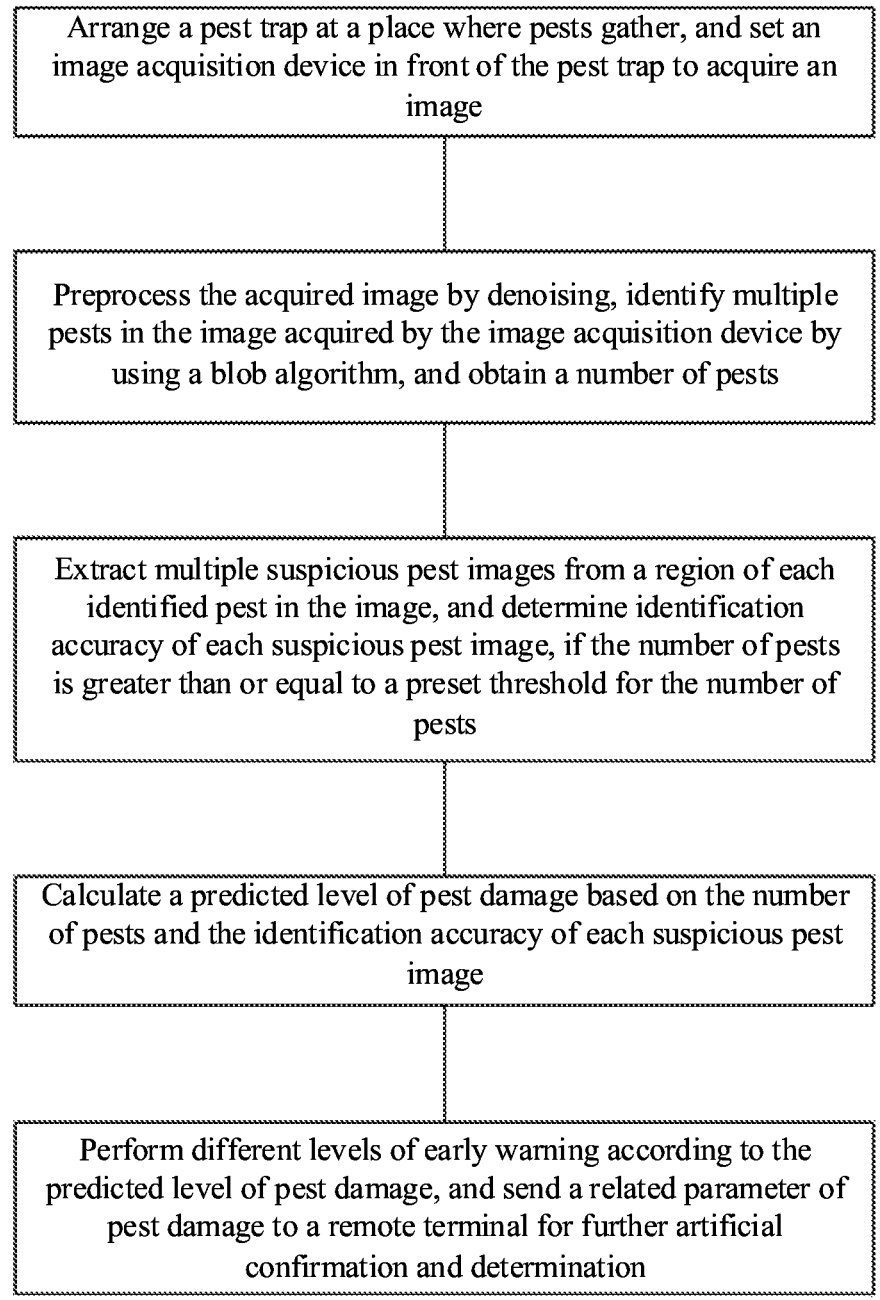
FIG. 1 is a block diagram of a method of the present patent.

As shown in FIG. 1, a pest monitoring method based on MV, including the following steps: arrange a pest trap at a place where pests gather, and set an image acquisition device in front of the pest trap to acquire an image;

preprocess the acquired image by denoising, identify multiple pests in the image acquired by the image acquisition device by using a blob algorithm, and obtain a number of pests;

extract multiple suspicious pest images from a region of each identified pest in the image, and determine identification accuracy of each suspicious pest image, if the number of pests is greater than or equal to a preset threshold for the number of pests, where the threshold for the number of pests can be 3; considering the phototaxis of a pest, for example, a citrus psyllid, if a pest damage occurs, the number of identified pests is likely to be more than 3; besides, the number of pests is identified under the interference of environmental factors such as a fallen leaf and a bee; therefore, when the number of pests is less than the threshold for the number of pests, that is, 3, it can be determined that no pest damage occurs and the growth of a crop is not affected; more preferably, the threshold for the number of pests can be obtained based on the results of multiple tests in an area with different degrees of pest damage or based on past experience;

calculate a predicted level of pest damage based on the number of pests and the identification accuracy of each suspicious pest image; and perform different levels of early warning according to the predicted level of pest damage, and send a related parameter of pest damage to a remote terminal for further artificial confirmation and determination.

The related parameter of pest damage includes the predicted level of pest damage, the number of pests, the region of each pest in the image, and the corresponding image acquired by the image acquisition device. The artificial determination is specifically: a person combines the above related parameter of pest damage to determine whether an actual number of pests in the image is consistent with or more than a number of identified pests, and if yes, takes a corresponding control measure according to the level of an early warning.

Specifically, the image acquisition device can be a camera.

The present invention acquires a pest image automatically through the image acquisition device in front of the pest trap. The present invention avoids the disadvantage of laborious visual inspection by a person, and realizes real-time pest monitoring. The present invention combines the number of pests and the identification accuracy of each suspicious pest image to calculate the predicted level of pest damage. Compared with the prior art that calculates the predicted level of pest damage based on the number of pests alone, the present invention has higher accuracy and obtains a more significant predicted level of pest damage. Therefore, the present invention can better guide pest control.

A statistical analysis model is established in advance. The statistical analysis model is used to calculate the predicted level of pest damage based on the number of pests and the identification accuracy of each suspicious pest image. The predicted level H(n) of pest damage is calculated based on the statistical analysis model according to the following formula:

$$H(n) = \begin{cases} \dfrac{\sum_{i=1}^{n} p_i}{n}, & n \geq allow_{max} \\ 0, & n < allow_{max} \end{cases}$$

where, n is the number of pests; $allow_{max}$ is the threshold for the number of pests; $p_i$ is the identification accuracy of an i-th suspicious pest image; a value range of H(n) is [0,1]. A pest damage grade is set according to the value of H(n). For example, a first grade corresponds to a value below 0.5, a second grade corresponds to a value of 0.5-0.7, and a third grade corresponds to a value of 0.7-0.9. An early warning is given based on these grades corresponding to the value of H(n).

The statistical analysis model is obtained based on training. The model can fit a relation between the predicted level of pest damage and the number of pests as well as the identification accuracy of each suspicious pest image. The final predicted level of pest damage is more targeted and more significant for guiding pest control. When the number of pests does not reach the threshold for the number of pests, the predicted level H(n) of pest damage is zero, that is, no pest damage occurs. When the number of pests is greater than or equal to the threshold for the number of pests, an average identification accuracy of all suspicious pest images is calculated. The suspicious pest images and respective possibility are taken into account, which is conducive to obtaining a more scientific predicted level H(n) of pest damage and improving the guiding significance of pest control.

The pest trap includes a box and a trap lamp arranged in the box. The box is a polyhedron, specifically a rectangular solid. The box is open on at least one side. The trap lamp uses a white light source with a good backlight effect. The box contains a volatile for luring a pest, for example, a mixed volatile of β-caryophyllene and terpinolene which lures a citrus psyllid. The image acquisition device is arranged to face a side of the box with an opening to acquire an image. The box is used to gather light of the trap lamp, so that the image acquired by the image acquisition device is clear. The use of the box is convenient to identify a pest in the image later and improve the identification accuracy. In this way, the present invention further improves the practicability of the method, and improves the prediction accuracy, thereby facilitating people to control the pest in time.

An opening of the box facing the image acquisition device is covered with a light-transmitting film. The image acquisition device should have a certain distance away from the box, so that a shooting range of the image acquisition device covers the light-transmitting film. The light-transmitting film makes the light received by the image acquisition device more uniform and softer. The light-transmitting film improves the imaging quality, facilitates the identification of a pest in the image later, and improves the identification accuracy. Therefore, the present invention further improves the practicability of the method, and improves the prediction accuracy, thereby facilitating people to control the pest in time.

In addition, due to the covering of the light-transmitting film, the light received by the image acquisition device is more uniform and softer. Thus, the image acquired by the image acquisition device has a cleaner background to distinguish a noise effectively. Therefore, it is possible to preprocess the image acquired by the image acquisition device by denoising and to make the shot image sharper.

The step of identifying multiple pests in the image acquired by the image acquisition device by using a blob algorithm is specifically: identify a region in the acquired image that blocks the light of the trap lamp; and determine whether a geometric feature of each region matches a shape of a pest, and if yes, identify the corresponding region as a pest. Because of the setting of the trap lamp, it is only necessary to determine whether a geometric feature of the region blocking the light of the trap lamp in the image matches a pest. This avoids a complicated image identification process, improving the identification efficiency. Therefore, this method ensures a real-time performance so that people can take a control measure more quickly against the pest.

Each region matches the shape of the pest is determined at least according to an area and a perimeter of the region. The area, the perimeter and a ratio of regions are important features. Their combination greatly reduces the rate of misjudgment, and improves the identification efficiency and the efficiency of obtaining the final predicted level of pest damage. Therefore, the method is timelier for pest control. More preferably, in addition to the calculation of the area and the perimeter of each region, a minimum circumscribed rectangle and a centroid position of each region need to be calculated.

When multiple suspicious pest images are extracted from a region of each identified pest in the image, in fact, the minimum circumscribed rectangle of the region of each pest in the image is also calculated in the above step. The minimum circumscribed rectangle locates the region of each pest in the image, so that multiple suspicious pest images can be extracted.

The area and the perimeter are calculated according to a pixel in the region. The area is obtained by accumulating all pixels in the region, and the perimeter is obtained by accumulating pixels at a boundary of the region. The region is generally an irregular polygon, and the simple accumulation by pixels can avoid a complex formula calculation of the area and perimeter of the irregular polygon.

Let an i-th region be $R_i(x,y)$, $f(x,y)$ is a binary pixel value at a pixel $(x,y)$ in the image acquired by the image acquisition device, then an area $S(R_i(x,y))$ of the i-th region is:

$$S(R_i(x, y)) = \sum_{(x,y) \in R_i(x,y)} f(x, y)$$

The binary pixel value $f(x,y)$ is obtained by preprocessing. In a specific implementation process, $f(x,y)$ at a pixel in a dark region of the image, that is, $f(x,y)$ in a region that blocks the light of the trap lamp, is set to 1, and $f(x,y)$ at a pixel in a bright region of the image is set to 0. Therefore, values of $f(x,y)$ in $R_i(x,y)$ can be accumulated to serve as the area of the region $R_i(x,y)$.

Figure 2:
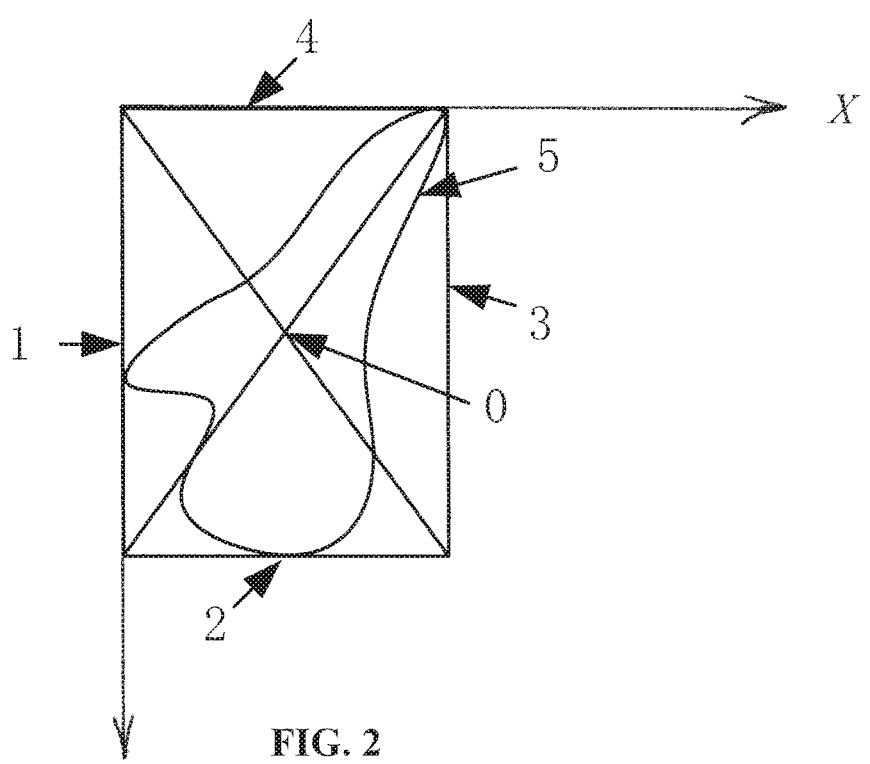
FIG. 2 is a schematic diagram of a region blocking light of a trap lamp in an image of the present patent.

A perimeter of the i-th region is a number of pixels $(x,y)$ on a boundary (numbered as 5 in FIG. 2) of the region.

A centroid (numbered as 0 in FIG. 2) of the i-th region is $(x_0, y_0)$, specifically:

$$\begin{cases} x_0 = M_{10}(R_i(x, y))/M_{00}(R_i(x, y)) \\ y_0 = M_{01}(R_i(x, y))/M_{00}(R_i(x, y)) \end{cases}$$

where, a matrix $M_{pq}(R_i(x,y)) = \Sigma_{(x,y) \in R_i(x,y)} f(x,y) \times x^p y^q$, for example, in the above formula, $M_{10}(R_i(x,y)) = \Sigma_{(x,y) \in R_i(x,y)} f(x,y) x^1 y^0$. Other parameters can be deduced by analogy.

Specifically, the minimum circumscribed rectangle of the i-th region is calculated by the following formulas:

$$\text{top} = \min_{y} \{(x, y) \mid (x, y) \in R_i(x, y)\}$$

$$\text{bottom} = \max_{y} \{(x, y) \mid (x, y) \in R_i(x, y)\}$$

$$\text{left} = \min_{x} \{(x, y) \mid (x, y) \in R_i(x, y)\}$$

$$\text{right} = \max_{x} \{(x, y) \mid (x, y) \in R_i(x, y)\}$$

An origin of the above coordinate values $(x,y)$ is a vertex of an upper left corner of the image. An X-axis is horizontal to the right, and a Y-axis is vertically downward. Therefore, left, bottom, right, and top correspond to the numbers 1, 2, 3 and 4, respectively, in FIG. 2. A left side of the minimum circumscribed rectangle corresponds to a minimum X-coordinate, a bottom side of the minimum circumscribed rectangle corresponds to a maximum Y-coordinate, and a top side of the minimum circumscribed rectangle corresponds to a minimum Y-coordinate.

A pest discriminative model is established in advance. The pest discriminative model is used to determine the identification accuracy of each suspicious pest image. The pest discriminative model is obtained based on training. The model can fit a relation between the identification accuracy of each suspicious pest image and each suspicious pest image. The final identification accuracy of the suspicious pest image is more targeted, and the final predicted level of pest damage is more significant for guiding pest control.

The step of establishing a pest discriminative model is specifically: make a positive sample set and a negative sample set of the pest image, the positive sample set being pest images in various situations, and the negative sample set including multiple images including no pest; and train a neural network by the positive sample set and the negative sample set to generate a pest discriminative model. The neural network is specifically a visual geometry group convolutional neural network (VGGNet).

It should be noted that the above embodiments are merely preferred embodiments of the present invention, and are not intended to limit the present invention. Although the present invention is described in detail with reference to the embodiments, those skilled in the art should understand that they may still make modifications to the technical solutions described in the above embodiments or make equivalent replacements to some technical features thereof. Any modifications, equivalent replacements and improvements etc. made within the spirit and principle of the present invention should fall within the protection scope of the present invention.

What is claimed is:

1. A pest monitoring method based on machine vision (VM), comprising:
    arranging a pest trap at a place where pests gather, and setting an image acquisition device in front of the pest trap to acquire an image;
    identifying a pest in the acquired image, and obtaining a number of pests;
    extracting multiple suspicious pest images from a region of each identified pest in the acquired image, and determining identification accuracy of each suspicious pest image when the number of pests is greater than or equal to a preset threshold for the number of pests; and
    calculating a predicted level of pest damage based on the number of pests and the identification accuracy of each suspicious pest image.

2. The pest monitoring method based on machine vision (VM) according to claim 1, wherein a statistical analysis model is established in advance; the statistical analysis model is used to calculate the predicted level of pest damage based on the number of pests and the identification accuracy of each suspicious pest image.

3. The pest monitoring method based on machine vision I(M according to claim 2, wherein the predicted level H(n) of pest damage is calculated based on the statistical analysis model according to the following formula:

$$H(n) = \begin{cases} \dfrac{\sum_{i=1}^{n} p_i}{n}, & n \geq allow_{max} \\ 0, & n < allow_{max} \end{cases}$$

wherein, n is the number of pests; allow$_{max}$ is the preset threshold for the number of pests; p$_i$ is the identification accuracy of an i-th suspicious pest image.

4. The pest monitoring method based on machine vision (VM) according to claim 3, wherein the acquired image needs to be preprocessed by denoising before identifying the pest in the acquired image and obtaining the number of pests.

5. The pest monitoring method based on machine vision (VM) according to claim 2, wherein the acquired image needs to be preprocessed by denoising before identifying the pest in the acquired image and obtaining the number of pests.

6. The pest monitoring method based on machine vision (VM) according to claim 1, wherein the pest trap comprises a box and a trap lamp arranged in the box; the box is a polyhedron, and the box is open on at least one side; the image acquisition device is arranged to face a side of the box with an opening to acquire an image.

7. The pest monitoring method based on machine vision (VM) according to claim 6, wherein an opening of the box facing the image acquisition device is covered with a light-transmitting film.

8. The pest monitoring method based on machine vision (VM) according to claim 7, wherein the acquired image needs to be preprocessed by denoising before identifying the pest in the acquired image and obtaining the number of pests.

9. The pest monitoring method based on machine vision (VM) according to claim 6, wherein the acquired image needs to be preprocessed by denoising before identifying the pest in the acquired image and obtaining the number of pests.

10. The pest monitoring method based on machine vision (VM) according to claim 1, wherein the identifying a pest in the acquired image comprises:
    identifying a region in the acquired image that blocks the light of the trap lamp; and
    determining whether a geometric feature of each region matches a shape of the pest, and if yes, identifying the corresponding region as a pest.

11. The pest monitoring method based on machine vision (VM) according to claim 10, wherein each region matching the shape of the pest is determined at least according to an area and a perimeter of the region.

12. The pest monitoring method based on machine vision (VM) according to claim 11, wherein the acquired image needs to be preprocessed by denoising before identifying the pest in the acquired image and obtaining the number of pests.

13. The pest monitoring method based on machine vision (VM) according to claim 10, wherein the acquired image needs to be preprocessed by denoising before identifying the pest in the acquired image and obtaining the number of pests.

14. The pest monitoring method based on machine vision (VM) according to claim 1, wherein a pest discriminative model is established in advance; the pest discriminative model is used to determine the identification accuracy of each suspicious pest image.

15. The pest monitoring method based on machine vision (VM) according to claim 14, wherein the establishing a pest discriminative model comprises:
    making a positive sample set and a negative sample set of each suspicious pest image, positive samples being pest images in various situations, and negative samples being images including no pest; and
    training a neural network by the positive sample set and the negative sample set to generate a pest discriminative model.

16. The pest monitoring method based on machine vision (VM) according to claim 15, wherein the acquired image needs to be preprocessed by denoising before identifying the pest in the acquired image and obtaining the number of pests.

17. The pest monitoring method based on machine vision (VM) according to claim 14, wherein the acquired image needs to be preprocessed by denoising before identifying the pest in the acquired image and obtaining the number of pests.

18. The pest monitoring method based on machine vision (VM) according to claim 1, wherein the acquired image needs to be preprocessed by denoising before identifying the pest in the acquired image and obtaining the number of pests.

* * * * *